(12) United States Patent
Schmidt et al.

(10) Patent No.: US 9,085,326 B2
(45) Date of Patent: Jul. 21, 2015

(54) PILLAR COVERING FOR MOTOR VEHICLES

(75) Inventors: Sebastian Schmidt, Stuttgart (DE);
Luc-Henry Blanche, Schwaikheim (DE); Ulrich Riegler, Lindhorst (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/344,571

(22) PCT Filed: Sep. 4, 2012

(86) PCT No.: PCT/EP2012/067196
§ 371 (c)(1),
(2), (4) Date: May 21, 2014

(87) PCT Pub. No.: WO2013/041367
PCT Pub. Date: Mar. 28, 2013

(65) Prior Publication Data
US 2014/0252804 A1    Sep. 11, 2014

(30) Foreign Application Priority Data

Sep. 23, 2011  (EP) ..................................... 11182550

(51) Int. Cl.
*B60R 13/00* (2006.01)
*B62D 25/04* (2006.01)
*B60R 13/04* (2006.01)
(Continued)

(52) U.S. Cl.
CPC ................ *B62D 25/04* (2013.01); *B29C 45/16* (2013.01); *B60R 13/04* (2013.01); *B29C 45/0025* (2013.01); *B29C 2045/0043* (2013.01); *B29C 2045/1682* (2013.01); *B29L 2031/3005* (2013.01)

(58) Field of Classification Search
CPC ......... B62D 25/04; B60R 13/04; B29C 45/16
USPC ............................................. 296/39.1, 193.06
See application file for complete search history.

(56) References Cited

U.S. PATENT DOCUMENTS

| 5,571,581 A | 11/1996 | Koizumi et al. |
| 6,103,168 A * | 8/2000 | Kelly ........................ 264/259 |
| 2011/0148150 A1 | 6/2011 | Gerndorf et al. |

FOREIGN PATENT DOCUMENTS

| DE | 3831274 | 3/1988 |
| DE | 4219344 | 12/1992 |

(Continued)

OTHER PUBLICATIONS

PCT International Search Report mailed on Dec. 5, 2012 for PCT/EP2012/067196 filed on Sep. 4, 2012 in the name of Saint-Gobain Glass France.

(Continued)

*Primary Examiner* — Joseph D Pape
(74) *Attorney, Agent, or Firm* — Steinfl & Bruno LLP

(57) ABSTRACT

A pillar covering for motor vehicles is described The pillar covering has a carrier part having an integrated window guide web and a mounting element, a narrowing at the point of contact of the window guide web with the carrier part, and a cover part connected to the carrier part via a contact surface, whereby the carrier part and the cover part form at least one common end portion and the contact surface within the end piece runs over a length of at least 1 mm at a mean angle of 5° to 60° above or below a mean axis along the contact surface outside the end piece.

16 Claims, 4 Drawing Sheets

Figure 1:
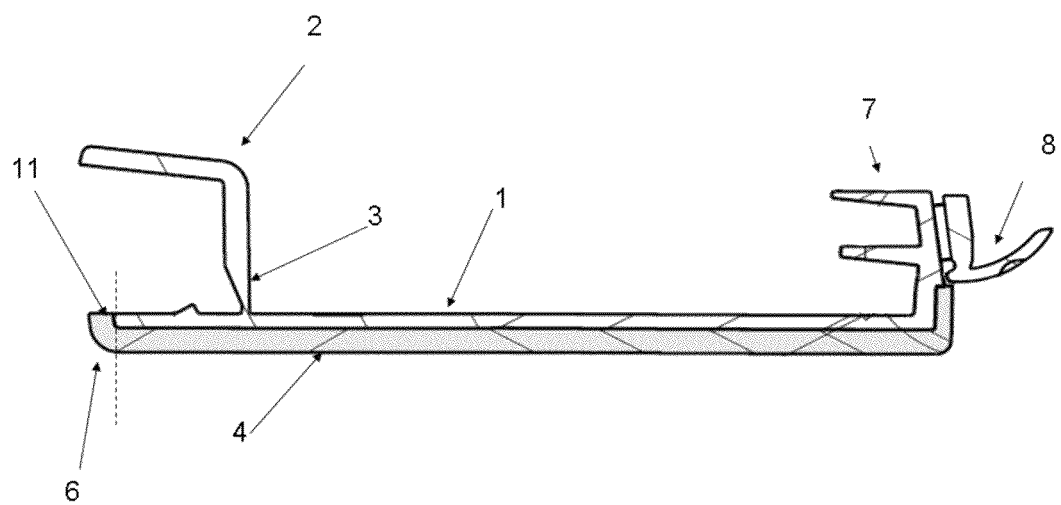

(51) Int. Cl.
*B29C 45/16* (2006.01)
*B29C 45/00* (2006.01)
*B29L 31/30* (2006.01)

(56) References Cited

FOREIGN PATENT DOCUMENTS

| | | |
|---|---|---|
| DE | 19633959 | 2/1997 |
| DE | 19722551 | 12/1998 |
| DE | 20201528 | 6/2003 |
| DE | 202004006873 | 7/2004 |
| DE | 102007024149 | 11/2008 |
| EP | 1695808 | 8/2006 |
| EP | 2272718 | 1/2011 |
| GB | 2209702 | 5/1989 |
| JP | 2009029252 | 2/2009 |
| WO | 2006094484 | 9/2006 |

OTHER PUBLICATIONS

PCT International Search Report mailed on Dec. 6, 2012 for PCT/EP2012/067199 filed on Sep. 4, 2012 in the name of Saint-Gobain Glass France.
PCT International Search Report mailed on Dec. 5, 2012 for PCT/EP2012/067198 filed on Sep. 4, 2012 in the name of Saint-Gobain Glass France.
PCT Written Opinion mailed on Dec. 5, 2012 for PCT/EP2012/067196 filed on Sep. 4, 2012 in the name of Saint-Gobain Glass France (German w/ English translation).
PCT Written Opinion mailed on Dec. 5, 2012 for PCT/EP2012/067198 filed on Sep. 4, 2012 in the name of Saint-Gobain Glass France (German w/ English translation).
Written Opinion mailed on Dec. 6, 2012 for PCT/EP2012/067199 filed on Sep. 4, 2012 in the name of Saint-Gobain Glass France (German original with English Translation).

* cited by examiner

PILLAR COVERING FOR MOTOR VEHICLES

CROSS REFERENCE TO RELATED APPLICATIONS

The present application is the US national stage of International Patent Application PCT/EP2012/067196 filed on Sep. 4, 2012 which, in turn, claims priority to European Patent Application EP 11182550.1 filed on Sep. 23, 2011.

The invention relates to a pillar covering for motor vehicles and use thereof.

In the wake of increasingly stringent regulations on the carbon dioxide emission of motor vehicles, there are strong efforts to reduce the weight of a vehicle and, thus, its fuel consumption. Constant innovations in the area of plastics enable the replacement of large portions of the metal automobile body with correspondingly lighter elements made of polymer materials. In particular, parts or even the entire window area can be replaced by elements made of polymer materials. In many cases, these have, along with a significantly lower weight, comparable hardness, stability, and toughness as with a vehicle window made of steel. Additionally, due to the weight reduction, the center of gravity of the vehicle is moved lower, which has a positive effect on handling. Moreover, compared to metals, polymer materials can be produced, processed, and shaped at significantly lower temperatures. This reduces the energy demand and the costs during production of the materials.

Molded parts made of polymer materials can be produced in virtually any desired shape and geometry. Special high-performance plastics such as aramids, for example, Kevlar, have very high strengths and stabilities.

Many material parts made of plastics must satisfy various requirements and functions. Important parameters here are stability, fracture behavior, scratch resistance, impact strength, or notch impact strength. Besides technical considerations such as weight and strength of the individual components, shape, geometry, and appearance play an increasingly important role. Especially in the automobile industry, along with mechanical properties, characteristics in the area of design and aesthetics are of great significance.

In order to combine various characteristics in polymer materials, they are composed of differently shaped and differently produced basic materials. Established methods for producing these materials include two-component or multi-component injection molding. In this way, it is possible to combine characteristics such as weathering resistance, surface gloss, and fracture resistance or torsional stability. In addition, the proportions of very expensive materials can be reduced.

DE 196 33 959 A1 discloses a molded article comprising a support and an outer decorative film. The outer film has a decorative layer and a protective layer, with the protective layer consisting of a photopolymerizable resin composition.

WO 2006/094484 A1 discloses a method for producing a two-dimensional, plastic vehicle body part including two components. In a preferred embodiment, the first component is made of a transparent polycarbonate and the second component is made of an opaque polycarbonate.

DE 197 22 551 A1 discloses a method for producing plastic parts in the two-component injection molding process.

EP 1 695 808 A1 discloses a decorative part for a motor vehicle, for example, a trim strip. The decorative part comprises a carrier part made of a thermoplastic plastic and a cover part. The decorative part is preferably produced by a multicomponent injection molding process.

Due to the different material properties of the individual polymers in the workpiece, differences in cooling behavior occur during production in the multicomponent injection molding process. Differences in heat dissipation can thus result in different shrinkage behaviors, which, in turn, results in an inhomogeneous appearance of the finished workpiece. In particular, in the case of workpieces with transparent or high-gloss elements, this readily results in a disruption of the reflection optics and thus to an inferior look, especially in the edge region.

The object of the invention is to provide a workpiece made of at least two different materials that has a uniform edge region with, at the same time, different material shrinkage behaviors.

The object of the invention is accomplished by a pillar covering for vehicles according to claim 1. Preferred embodiments emerge from the subclaims.

The use according to the invention of the pillar covering for vehicles emerges from another independent claim. Preferred embodiments emerge from the subclaims.

The pillar covering for vehicles according to the invention comprises at least one polymer carrier part with an integrated window guide web as well as a narrowing between the polymer carrier part and the window guide web. The preferably molded window guide web protrudes from the actual carrier part, and the precise dimensioning depends on the geometry of the corresponding workpiece on the vehicle. The window guide web is preferably implemented approx. L-shaped and preferably has, in the protruding region, an angle of 45° to 135° relative to the base surface of the polymer carrier part. The window guide web preferably has, in both sub-webs, a respective length of 10 mm to 20 mm. In the context of the invention, the expression "tapered" means a linear or gradual decrease in the thickness of the window guide web near or adjacent the base surface of the polymer carrier part. This decrease in thickness of the integrated window guide web ensures improved reflection optics on the visible side of the pillar covering and enables a reduction in the weight of the pillar covering and a savings of polymer starting material. The window guide web is preferably manufactured from the same material as the polymer carrier part and is preferably produced in the injection molding process using molds with corresponding cavities.

The polymer carrier part provides for the stability of the pillar covering and contains polymer materials with the highest possible strength, scratch resistance, impact strength, or notch impact strength and relatively low susceptibility to breakage. The polymer carrier part preferably includes a mounting element. The mounting element is preferably configured F-shaped. The precise shaping of the mounting element is determined by the corresponding opposing part of the vehicle body.

A polymer cover part is connected to the polymer carrier part via a contact surface. The expression "contact surface" describes the boundary surface between the polymer carrier part and the polymer cover part. The polymer cover part can assume both decorative functions and functions in the area of tool resistance. Examples of this are surfaces or coatings that increase the weathering, UV, or chemical resistance of the pillar covering. The polymer carrier part and the polymer cover part form at least one common rounded end portion. In the context of the invention, the expression "end portion" preferably refers to an end region in which the total thickness of the polymer carrier part and the polymer cover part or their individual thicknesses decrease gradually or linearly. The contact surface between a polymer carrier part and a polymer cover part runs inside the end portion over a length of at least 1 mm (measured from the edge of the end portion) at a mean angle of 5° to 60° (degrees) to the polymer carrier part or away from the polymer carrier part (above or below the mean axis of the contact surface between the polymer carrier part and the polymer cover part outside the end portion(s)). The contact surface can run in a straight line or a curve. The contact surface runs inside the end portion, preferably over a length of 2 mm to 20 mm at a mean angle of 10° to 50°. The offset of the contact surface from the mean axis of the contact surface between the polymer carrier part and the polymer cover part (horizontal) effects a thinning of the proportion of polymer carrier part or polymer cover part in the end portion. This thinning of one material component of the polymer carrier part or polymer cover part permits adjustment of the shrinkage and cooling behavior in the end portion. In this manner, the formation of optical distortions in the end portion is prevented. With slower cooling of the polymer carrier part, its mass can be reduced in the region of the end portion and, thus, can enable an overall faster cooling with less mass, preferably simultaneously with the polymer cover part.

Depending on the geometry of the pillar covering, even further common, preferably rounded, end portions may be present. This edge geometry according to the invention can be implemented circumferentially on all common edges of the polymer carrier part and polymer cover part inside the pillar covering or only on individual component edges.

The narrowing tapers preferably from 1 mm to 4 mm down to 0.2 mm to 2 mm. These dimensions enable high stability within the narrowing with simultaneously minimal weight.

A stiffening rib is preferably fitted inside the narrowing, particularly preferably a plurality of stiffening ribs are fitted inside the narrowing. The stiffening ribs significantly increase the stability and breakage safety of the window guide web and are disposed particularly space-savingly inside the narrowing.

The polymer carrier part contains preferably polyethylene (PE), polycarbonates (PC), polypropylene (PP), polystyrene, polybutadiene, polynitriles, polyesters, polyurethanes, polymethyl methacrylates, polyacrylates, polyesters, polyamides, polyethylene terephthalate (PET), preferably acrylonitrile-butadiene-styrene (ABS), acrylester-styrene-acrylonitrile (ASA), acrylonitrile-butadiene-styrene-polycarbonate (ABS+PC), and/or copolymers or mixtures thereof.

The window guide web and/or the mounting element preferably have, on the surface, a wall thickness thinning to 0.5 mm to 3 mm, with the thinned bottom wall of the window guide web and/or the mounting element preferably reinforced by a honeycomb, circular, or polygonal raised surface structure, particularly preferably a hexagonal raised honeycomb surface structure. The raised surface structure ensures, even with thinning of the wall thickness, the stability and the breakage safety of the window guide web and/or of the mounting element. The wall thickness thinning reduces the weight of the pillar covering. The raised structure preferably has a thickness of 0.2 mm to 1.5 mm. The total thickness of the window guide web and the raised surface structure is preferably greater by a factor of 1.2 to 3 than the thickness of the underlying window guide web. The factor mentioned ensures an optimum weight-to-stability ratio of the window guide web.

The raised surface structure preferably has a tilt of 1° to 15° relative to the perpendicular on the surface of the window guide web and/or the mounting element below the surface structure. This draft angle improves the removal of the fracture-sensitive window guide web and/or of the mounting element from the injection mold.

The window guide web and/or the mounting element have, in an optional embodiment, the raised surface structure on regions of the window guide web and/or of the mounting element without wall thickness thinning.

The polymer cover part preferably contains polycarbonates (PC), polymethyl methacrylate (PMMA), styrene-acrylonitrile (SAN), and/or copolymers or mixtures thereof. These polymers permit processing to high-gloss surfaces, glasslike in some cases.

The polymer carrier part preferably contains inorganic or organic fillers, particularly preferably $SiO_2$, $Al_2O_3$, $TiO_2$, clay minerals, silicates, zeolites, glass fibers, carbon fibers, glass beads, organic fibers, and/or mixtures thereof. The fillers can further increase the stability of the carrier part. In addition, the fillers can reduce material costs or, optionally, increase the fire resistance of the polymer carrier part.

The mounting element preferably has a sealing lip. The sealing lip enables a flexible and leakproof installation of the pillar covering in the vehicle.

The polymer cover part preferably includes a hard coat, particularly preferably thermal- or UV-curing coatings, particularly preferably polysiloxanes, polyacrylates, polymethacrylates, and/or mixtures or copolymers thereof. The hard coat improves the resistance to mechanical scratch damage, weathering effects, UV radiation, and/or aggressive chemicals from the air or from soil water. In addition, the hard coat can even also assume decorative functions.

The polymer cover part preferably has a mean optical transparency of more than 60%, preferably more than 80% in the range from 400 nm to 800 nm. The high optical transparency gives the polymer cover part a glasslike appearance with only a low weight of its own.

The stiffening ribs preferably are from 1 cm to 15 cm apart, preferably 2 cm to 10 cm. The stiffening ribs thus placed significantly increase the stability and breakage safety of the window guide web.

The window guide web and/or the mounting element preferably have, on the side opposite the narrowing, reinforcing ribs that further increase the stability of the window guide web and/or of the mounting element. The pillar cover includes particularly preferably stiffening ribs and reinforcing ribs.

The pillar covering according to the invention is preferably produced using a multicomponent injection molding process or a multicomponent injection-compression process.

The invention further includes the use of the pillar covering in vehicles, preferably motor vehicles, trucks, buses, particularly preferably as a trim strip in motor vehicles.

The invention is explained in detail in the following with reference to figures. The figures are purely schematic presentations and not to scale. They in no way restrict the invention.

Figure 2:
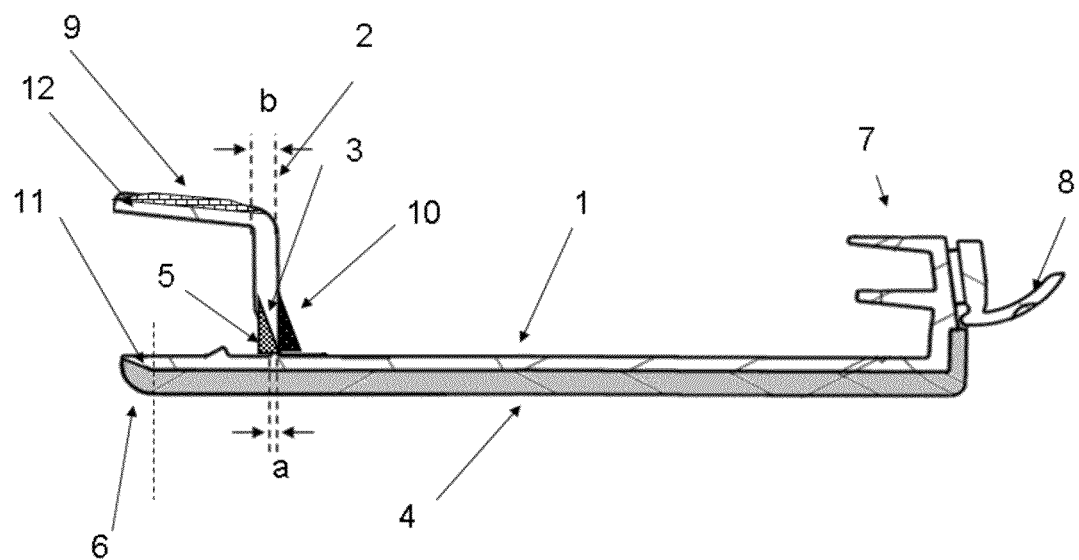
Figure 3A:
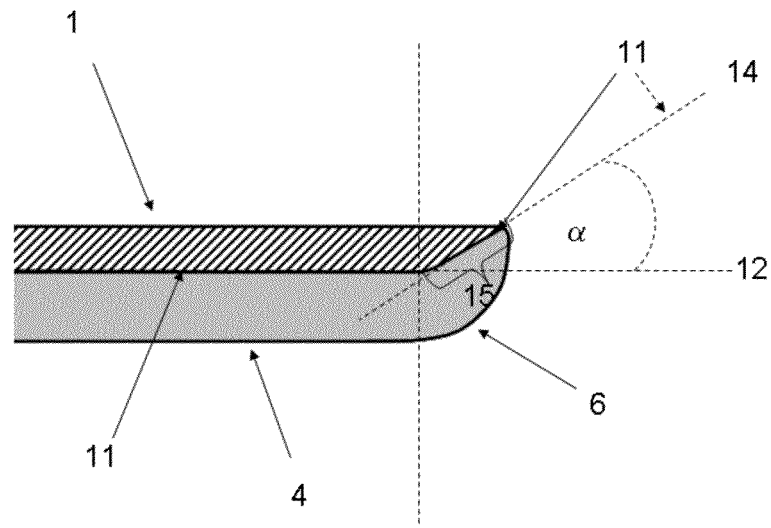
Figure 3B:
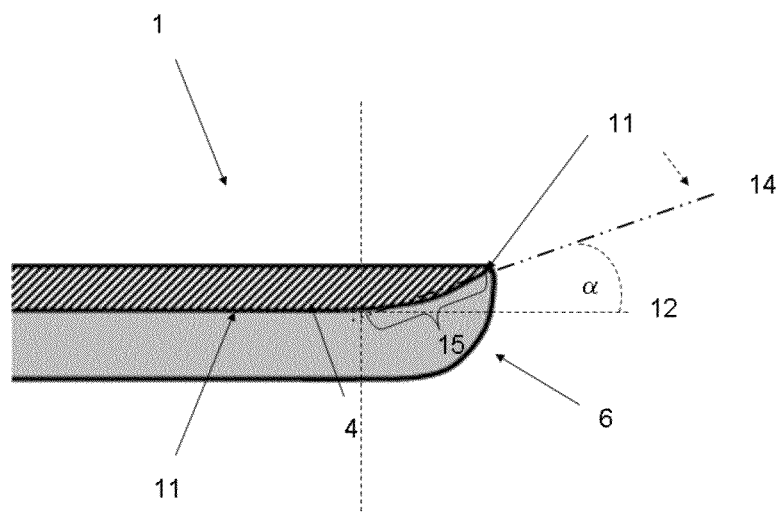
Figure 4:
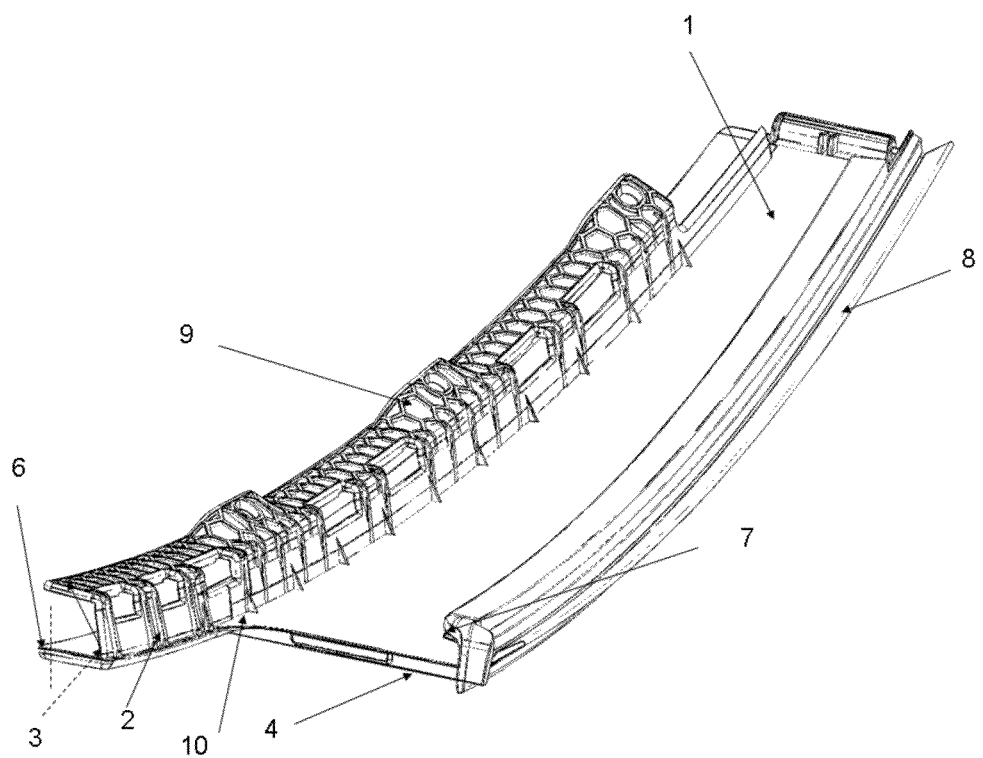

They depict:

FIG. 1 a cross-section of a pillar covering according to the prior art,

FIG. 2 a cross-section of a pillar covering according to the invention,

FIG. 3a an enlarged cross-section of the contact surface between the polymer carrier part and the polymer cover part, FIG. 3b an enlarged cross-section of the contact surface between the polymer carrier part and the polymer cover part, and FIG. 4 a three-dimensional view of a preferred embodiment of the pillar covering.

FIG. 1 depicts a cross-section of a pillar covering according to the prior art. A polymer carrier part (1) with a molded window guide web (2) and an F-shaped mounting element (7) with a sealing lip (8) is surrounded by a polymer cover part (4). The window guide web (2) is connected via a narrowing (3) to the polymer carrier part (1). The region of the rounded end portion (6) (left of the dashed line) transitions gradually along the contact surface (11) into the polymer carrier part (1) and the polymer cover part (4). In the rounded end portion (6), the polymer cover part (4) encloses the polymer carrier part (1). Due to the different materials of the polymer cover part (4) and of the polymer carrier part (1), optical distortions and an irregular phase boundary at the contact surface (11) can occur during cooling after a 2-component injection molding process.

FIG. 2 depicts a cross-section of a pillar covering according to the invention. The basic structure composed of a polymer carrier part (1) with a window guide web (2), F-shaped mounting element (7) with a sealing lip (8), and polymer cover part (4) corresponds to that depicted in FIG. 1. A stiffening rib (5) is disposed inside the narrowing (3) and permits effective stabilization of the window guide web (2) with no additional space requirement. The window guide web (2) decreases inside the narrowing (3) from the larger starting diameter (b) to the smaller diameter (a). The window guide web (2) has a wall thickness thinning (13) to a thickness of 0.5 mm to 3 mm and a raised structure (9). In the region of the rounded end portion (6) (left of the vertical dashed line), the contact surface (11) between the polymer carrier part (1) and the polymer cover part (4) runs above the axis (12) (horizontal dashed line) averaged over the horizontal region of the contact surface (11) at an angle of 5° to 60°.

FIG. 3a depicts an enlarged cross-section of the contact surface (11) between the polymer carrier part (1) and the polymer cover part (4). Inside the end portion (6), the contact surface (11) runs over a length (15) of at least 1 mm at an angle α (alpha) of 5° to 60° between the horizontally averaged axis (12) along the contact surface (11) outside the end portion (6) and the mean axis (14) between the polymer carrier part (1) and the polymer cover part (4) inside the end portion (6).

FIG. 3b depicts another enlarged cross-section of the contact surface (11) between the polymer carrier part (1) and the polymer cover part (4). Inside the end portion (6), the contact surface (11) runs over a length (15) of at least 1 mm at an angle α (alpha) of 5° to 60° between the horizontally averaged axis (12) along the contact surface (11) outside the end portion (6) and the mean axis (14) between the polymer carrier part (1) and the polymer cover part (4) inside the end portion (6). In this example, the contact surface (11) runs along the length (15) via a curved route. The axis (14) is preferably determined as a simple linear regression line along the length (15).

FIG. 4 depicts a three-dimensional view of a preferred embodiment of the pillar covering. The structure corresponds to that depicted in FIG. 2. The narrowing (3) cannot be seen due to the perspective. The raised, honeycomb-like surface structure (9) is disposed on the surface of the window guide web (2) in the form of regular hexagons covering the surface. The raised surface structure (9) reinforces the window guide web (2), permits the reduction of the wall thickness of the window guide web (2). The reinforcing ribs (10) can be disposed both with regular and irregular spacing on the outside of the window guide web (2). The region of the end portion (6) is indicated left of the dashed line.

LIST OF REFERENCE CHARACTERS (1) polymer carrier part
(2) window guide web
(3) narrowing
(4) polymer cover part
(5) stiffening rib
(6) end portion
(7) mounting element
(8) sealing lip
(9) raised structure
(10) reinforcing rib
(11) contact surface
(12) contact surface axis/horizontally averaged axis over the component (without vertical injections)
(13) wall thickness thinning
(14) mean axis between the polymer carrier part (1) and the polymer cover part (4) inside the end portion (6)
(15) length of the angled contact surface inside the end portion
(a) minimum dimension of the narrowing
(b) maximum dimension of the narrowing
(α) angle (alpha) in the end portion between the contact surface and the horizontally averaged contact surface

The invention claimed is:

1. A pillar covering for vehicles comprising:
   a carrier part with an integrated window guide web and a mounting element;
   a narrowing at a point of contact of the window guide web with the carrier part, wherein at least one stiffening rib is fitted inside the narrowing; and
   a polymer cover part connected to the carrier part via a contact surface,
   wherein the carrier part and the cover part form at least one common end portion having a deviation of the contact surface from a mean axis along the contact surface in a region adjacent the end portion, wherein the contact surface of the end portion runs over at least 1 mm at a mean angle α (alpha) of 5° to 60° above or below the mean axis.

2. The pillar covering according to claim 1, wherein the window guide web has reinforcing ribs.

3. A pillar covering for vehicles comprising:
   a carrier part with an integrated window guide web and a mounting element, wherein the window guide web has reinforcing ribs;
   a narrowing at a point of contact of the window guide web with the carrier part; and
   a polymer cover part connected to the carrier part via a contact surface,
   wherein the carrier part and the cover part form at least one common end portion having a deviation of the contact surface from a mean axis along the contact surface in a region adjacent the end portion, wherein the contact surface of the end portion runs over at least 1 mm at a mean angle α (alpha) of 5° to 60° above or below the mean axis.

4. The pillar covering according to claim 1, 2 or 3, wherein the carrier part contains polyethylene (PE), polycarbonates (PC), polypropylene (PP), polystyrene, polybutadiene, polynitriles, polyesters, polyurethanes, polymethyl methacrylates, polyacrylates, polyamides, polyethylene terephthalate (PET), polybutylene terephthalate (PBT), preferably acrylonitrile-butadiene-styrene (ABS), acrylester-styrene-acrylonitrile (ASA), acrylonitrile-butadiene-styrene—polycarbonate (ABS/PC), PET/PC, PBT/PC, and/or copolymers or mixtures thereof.

5. The pillar covering according to claim 1, 2 or 3, wherein the window guide web and/or the mounting element has a raised surface structure.

6. The pillar covering according to claim 1, 2 or 3, wherein the cover part contains polycarbonates (PC), polymethyl methacrylate (PMMA), styrene-acrylonitrile (SAN), and/or copolymers or mixtures thereof.

7. The pillar covering according to claim 1, 2 or 3, wherein the mounting element is configured F-shaped.

8. The pillar covering according to claim 1, 2 or 3, wherein the carrier part contains inorganic or organic fillers.

9. The pillar covering according to claim 1, 2 or 3, wherein the mounting element has a sealing lip.

10. The pillar covering according to claim 1, 2 or 3, wherein the cover part includes a hard coat.

11. The pillar covering according to claim 1 or 2, wherein each of the at least one stiffening rib is placed from 1 cm to 15 cm apart.

12. The pillar covering according to claim 1 or 2, wherein each of the at least one stiffening rib is placed 2 cm to 10 cm apart.

13. The pillar covering according to claim 5, wherein the raised surface structure is a honeycomb, circular or polygonal raised surface structure.

14. The pillar covering according to claim 13, wherein the raised surface structure is a hexagonal raised surface structure.

15. The pillar covering according to claim 8, wherein the fillers are $SiO_2$, $Al_2O_3$, $TiO_2$, clay minerals, silicates, zeolites, glass fibers, carbon fibers, glass beads, organic fibers, and/or mixtures thereof.

16. The pillar covering according to claim 10, wherein the hard coat is a thermal- or UV-curing coating, preferably polysiloxanes, polyacrylates, polymethacrylates, and/or mixtures or copolymers thereof.

* * * * *